United States Patent Office 3,120,246
Patented Feb. 4, 1964

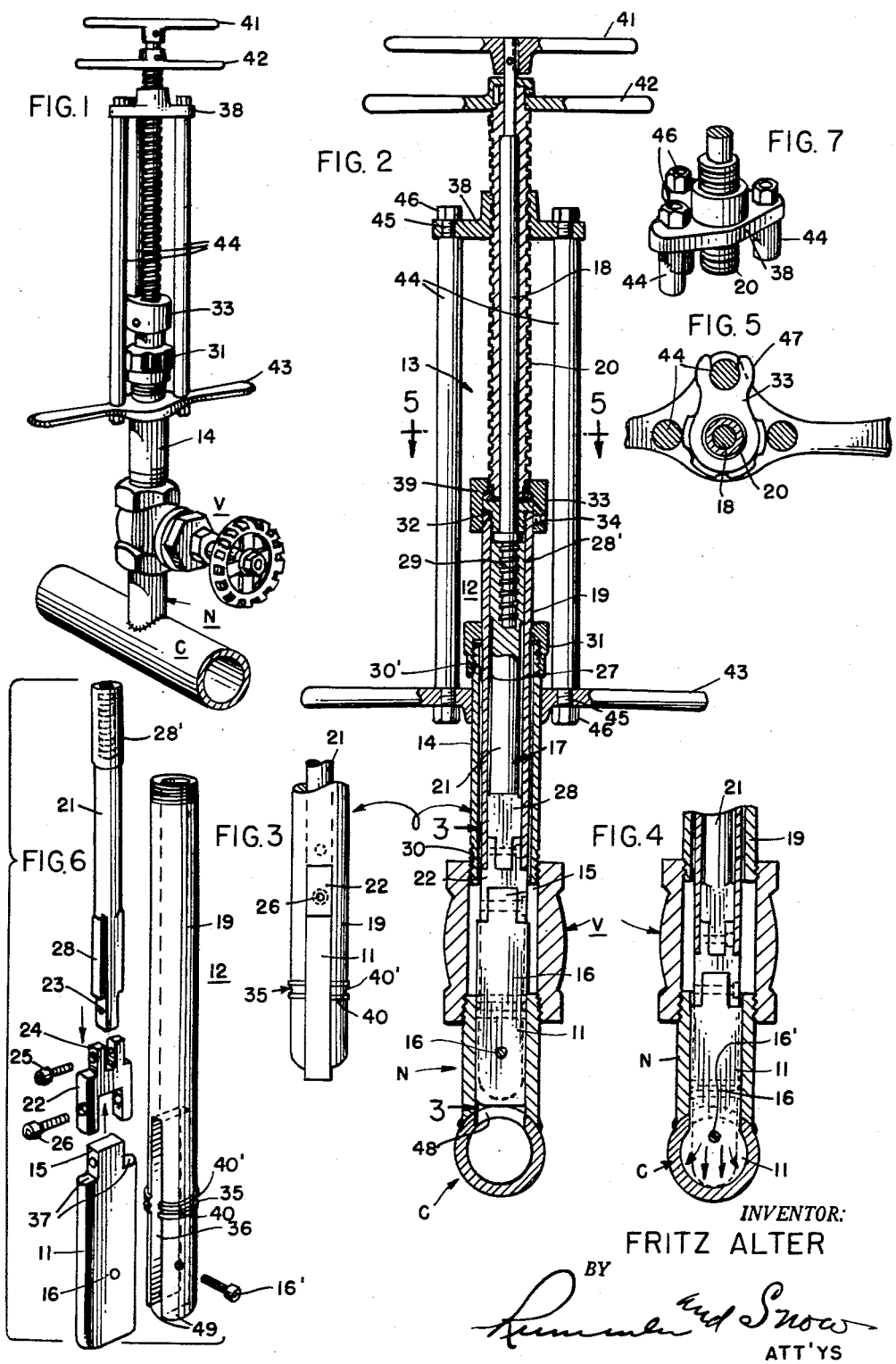

3,120,246
CONDUIT STOPPER
Fritz Alter, Fox Lake, Ill., assignor to Frandsen Bros.
Tool & Mfg. Co., Grayslake, Ill., a partnership
Filed May 26, 1960, Ser. No. 31,913
2 Claims. (Cl. 138—94)

This invention relates to conduit stoppers of the type required to temporarily shut off the high pressure flow through a conduit adjacent a point requiring repair or service attachments.

The main objects of this invention are to provide an improved stopper for insertion into a high pressure fluid-flow conduit to shut off the fluid flow to permit operation on the conduit adjacently beyond the insertion of the stopper; to provide a stopper of this kind having an improved form of element for interiorly blocking off the conduit; to provide an improved mounting of the conduit-blocking element for successively effecting its insertion into the conduit, its expansion into contact with the walls of the conduit, and its later retraction to permit its withdrawal from the conduit; and to provide an improved form of stopper of this kind the several parts of which are simple in structure, economical to manufacture, and facile to assemble and use and, later, disassemble and store.

One specific embodiment of this invention is shown in the accompanying drawing in which:

FIGURE 1 is a perspective view of a stopper, constructed in accordance with this invention, positioned on a conduit ready for use;

FIG. 2 is an enlarged, vertical-sectional view of the same;

FIG. 3 is a fragmentary side view of the conduit-blocking element and lower end of the guide shaft, taken on the plane of the line 3—3 of FIG. 2;

FIG. 4 is a fragmentary view of the lower end of FIG. 2 but showing the conduit-blocking element expanded into the conduit to shut off the flow therethrough;

FIG. 5 is a fragmentary, transverse, sectional view taken on the plane of the line 5—5 of FIG. 2;

FIG. 6 is an exploded perspective of the conduit-blocking element and its mounting guide shaft and retainer-pressure bar; and FIG. 7 is a fragmentary, perspective of the top end of the supporting frame for the conduit-blocking-element mounting.

The essential concept of this invention involves a rectangular-shaped element formed of pressure-responsive material set in a multiple-part mounting attached to a gate-valve adapter, which mounting parts are axially shiftable, relative to each other on a supporting frame, to successively insert the element into the conduit, expand the element to block conduit flow, and subsequently to permit contraction of the element for effecting its withdrawal.

A conduit-stopper embodying the foregoing concept, for use with a conduit gate valve V, comprises a conduit-blocking element 11 set in a mounting 12 axially shiftable on a supporting frame 13 attached to a gate-valve adapter 14.

When a conduit C requires repair, or the adding of a service branch, at some distance from an installed shut-off valve, the conduit C has to be tapped and a nipple N welded to the conduit C for the attachment of a gate-valve V and the positioning thereon of the stopper.

The tapping of the conduit C and the welding of the nipple N thereto are effected in a well-known manner. When this operation is completed and the gate-valve V is secured in place on the nipple N, the stopper, attached to the adapter 14, is mounted on the gate-valve V preparatory to lowering the element 11 into the conduit C and expanding it to conform to the interior wall of the conduit so as to block fluid flow beyond that point.

The element 11, which constitutes a most essential feature of this invention, is formed of a pressure-responsive substance such as rubber, Neoprene, or the like. Its geometric shape, as herein shown, is that of an elongated rectangular prism with a reduced inner end 15 whereby it is operatively connected to the mounting 12.

The mounting 12, for the element 11, comprises a retainer-pressure bar 17, a pressure-bar screw 18, a supporting guide-shaft 19 and an adjusting screw 20, all concentrically arranged for axial shifting on the support frame 13 after it has been secured to the adapter 14, as will be explained presently.

The retainer-pressure bar 17 comprises a rod 21 and a Y-shaped bracket 22. The lower end of the rod 21 has a reduced shank 23 which fits between and is hinged to a pair of bracket lugs 24 by a pin 25. The bracket 22 seats the reduced end 15 of the element 11 and is secured thereto by a pin 26. This retainer-pressure bar-rod 21 is of reduced diameter throughout the middle portion 27 (see FIGS. 2 and 6) having end heads 28 and 28' fitting in the guide shaft 19. The upper head 28' of the rod 21 is threaded to receive the threaded end 29 of the pressure-bar screw 18 embraced within the adjusting screw 20 and mounting at its upper end an operating handle, as presently will be explained more fully.

The pressure-bar screw 18 is in the form of a rod journaled in the adjusting screw 20 and extending outwardly above the upper end of the adjusting screw 20. The lower end of the pressure-bar screw 18 has a high-pitch screw-thread 29 embraced within the threaded head 28' of the retainer rod 21.

The guide-shaft 19, of the element mounting 12, is encased in the valve adapter 14, which is a short section of tubing externally threaded at 30 and 30' for connection to the gate valve V and mounting a packing nut 31 at its upper end. Such guide shaft 19, at its upper end, mounts a threaded plug 32 and guide collar 33 keyed to the guide shaft by a set screw 34. At its lower end the guide shaft 19 has an elongated slot 36 (see FIG. 6) of width and length approximating the dimensions of the element so as to seat the element 11 with the shoulders 37 abutting that inner portion of the guide shaft 19 which defines the upper end of the slot 36. The lower extremity 49 of the guide shaft 19 is rounded on a radius substantially the same as the inner radius of the conduit C wherewith this improved stopper is to be used. When the element 11 is so positioned in the guide shaft 19, the lower end of the element 11 extends below the rounded end of the guide shaft 19.

The guide shaft 19 is of an external diameter slightly less than the internal diameters of the nipple N and the valve adapter 14—which diameters are substantially the same. However, telescopic support for the guide shaft 19 in the nipple N is attained by a lubricating ring 35 located inwardly from the lower end 49 of the shaft 19. This ring 35 is formed by a pair of axially-spaced circumferential integral ribs 40 of an outside diameter substantially the same as the internal diameter of the nipple N. The space between the ribs 40 is concave to form a grease pocket 40' insuring easy sliding contact for the guide shaft 19 within the nipple N.

The adjusting screw 20 has a thread of substantial pitch and threaded into an upper flange-bracket 38. The lower end of the adjusting screw 20 is swivelled to the upper end of the guide shaft 19 by the guide collar 33, suitably secured to the end of the adjusting screw by a set screw 34.

The pressure-bar screw 18 and this adjusting screw 20 have handles 41 and 42 secured thereto, respectively, one closely above the other, for the independent turning of the pressure-bar screw 18 and the adjusting screw 20, as will be explained presently.

The supporting frame 13 comprises the two flanged brackets 38 and 43 secured in spaced relationship by a set of three rods 44. The rods 44 have reduced ends 45 on which are screwed nuts 46 for retaining the parts in their normal assembled relationship. One of these rods 44 is engaged by the forked end 47 on the guide collar 33, whereby the lower end of the adjusting screw 18 is swivelled to the upper end of the guide shaft 19 through the medium of a bushing 39 secured to the end of the adjusting screw 20.

The conduit stopper, constructed in accordance with this invention, is used in the following manner:

The preliminary operation involves first welding the nipple N to the conduit C, as shown best in FIG. 1. A gate valve V then is secured to the nipple N. A suitable saw-adapter and mandrel (not here shown) are inserted through the open valve V and a round hole 48 (FIG. 2) is cut in the conduit C of substantially the same diameter as the inside diameter of the nipple N.

These parts being removed, the adapter 14 is screwed into the valve V whereupon the stopper is set in position, as shown in the drawings.

With the valve V again opened, the handle 42 is rotated to shift the guide shaft 19 downwardly to the point of bringing the arcuate-shaped extremity 49 into contact with the bottom of the conduit C. Thereupon, the guide shaft 19 extends across the conduit C as indicated in dot and dash outline at the bottom of FIG. 4. The handle 41 is then turned to force the retainer-pressure bar 17 along the guide shaft 19 and so pressure the element 11 as to expand it outwardly of the slot 36 into fluid-sealing contact with the interior wall of the conduit C. Concurrently, the element 11 will be pressured in firm contact with the opposed walls of the guide shaft defining the slot 36 so as to preclude all possibility of any gas to escape upwardly through any parts of the mounting 12.

When the work on the conduit is completed the reverse turning of the handle 41 will release the pressure on the expanded element 11. This is done slowly to give the substance time to gradually resume its normal rectangular shape within the slot 36 of the guide shaft 19. As soon as this has had time to occur, the reverse turning of the handle 42 retracts the guide shaft 19 and the retainer-pressure bar 17 and the withdrawal of the element 11 from the opening 48, and into the valve adapter 14 above the valve V. After closing the valve V the stopper can be removed by unscrewing the adapter 14 from the gate valve V. After plugging the nipple N in the usual manner, the gate valve V may be removed.

Although but one specific embodiment of this invention is herein shown and described it will be understood that details of the construction shown may be altered or omitted without departing from the spirit of the invention as defined by the following claims.

I claim:

1. A conduit stopper comprising, a pair of flanged brackets secured in fixed parallel relationship by three circularly-spaced rods to form a supporting frame, the lower bracket being concentrically positionable on an adapter radially positioned on a conduit, a packing nut secured to the upper end of the adapter, a hollow guide shaft shiftably supported in the packing nut and having a slot extending inwardly from the lower end thereof, a hollow adjusting screw threaded on the upper bracket for axial movement relative thereto, a guide collar swivelled on the inner end of the adjusting screw and keyed to the opposed upper end of the guide shaft, an integral fork on the collar slidably embracing one of the rods to retain the collar against rotation, a retainer-bar slidably mounted in the hollow guide-shaft above the slot, a pressure bar rotatively mounted in the hollow adjusting screw and extending outwardly above the adjusting screw and at its inner end threaded into the upper end of the retainer-bar, an element of pressure-responsive substance of transverse rectangular cross-section secured at its inner end to the end of the retainer bar for seating in the guide-shaft slot, and separate handle means fixed on the upper end of the adjusting screw and the pressure bar for independently rotating the adjusting screw and the pressure bar respectively for forcing the guide shaft and the element through an opening in the conduit to the interior of the conduit and then expanding the element outwardly of the guide-shaft slot into fluid-sealing contact with the conduit interior to shut off flow therethrough.

2. A conduit stopper comprising, a pair of flange brackets secured in spaced parallel relationship by a plurality of rods to form a supporting frame, the lower bracket being concentrically positionable on an adapter radially positioned on a conduit, a hollow guide shaft axially shiftable on the supporting frame, the guide shaft having a slot extending inwardly from the lower end, a hollow adjusting screw threaded on the upper bracket for axial movement on the frame and swivelled at its inner end to the opposed upper end of the hollow guide shaft, a retainer bar slidably mounted in the hollow guide shaft above the slot, a pressure bar rotatively mounted in the hollow adjusting screw and extending outwardly above the adjusting screw and at its inner end threaded into the upper end of the retainer bar, an element of pressure-responsive substance of transverse rectangular cross-section secured at its inner end to the end of the retainer bar for seating in the guide shaft slot, the guide shaft intermediate the length of the slot having a pair of axially-spaced integral circumferential ribs dimensioned to fit the interior wall of the adapter and form a circumferential grease pocket to lubricate the movement of the guide shaft through the adapter, and separate handle means fixed on the upper ends of the adjusting screw and pressure bar for independently rotating the adjusting screw and the pressure bar respectively for successively forcing the guide shaft and the element through an opening in the conduit to the interior of the conduit and then expanding the element outwardly of the guide-shaft slot into fluid-sealing contact with the conduit interior to shut off flow therethrough.

References Cited in the file of this patent

UNITED STATES PATENTS

| | | |
|---|---|---|
| 1,833,700 | Wolf | Nov. 24, 1931 |
| 2,073,740 | Gardner | Mar. 16, 1937 |
| 2,272,734 | Witt | Feb. 19, 1942 |
| 2,476,907 | Preston | July 19, 1949 |
| 2,780,244 | Lee | Feb. 5, 1957 |